(12) United States Patent
Kodama

(10) Patent No.: US 7,185,030 B2
(45) Date of Patent: Feb. 27, 2007

(54) STORAGE SYSTEM STORING A FILE WITH MULTIPLE DIFFERENT FORMATS AND METHOD THEREOF

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 10/802,852

(22) Filed: Mar. 18, 2004

(65) Prior Publication Data

US 2005/0210083 A1    Sep. 22, 2005

(51) Int. Cl.
*G06F 12/00* (2006.01)
*G06F 7/00* (2006.01)
*G06F 17/00* (2006.01)

(52) U.S. Cl. .................. 707/203; 707/10; 707/200

(58) Field of Classification Search ............ 707/10, 707/200, 203, 204, 101, 104.1
See application file for complete search history.

(56) References Cited

U.S. PATENT DOCUMENTS

| | | | |
|---|---|---|---|
| 5,708,828 A | 1/1998 | Coleman | |
| 5,848,415 A | 12/1998 | Guck | |
| 6,003,042 A * | 12/1999 | Melahn | 707/203 |
| 6,122,685 A | 9/2000 | Bachmat | |
| 6,615,327 B1 | 9/2003 | Satoyama et al. | |
| 6,691,113 B1 | 2/2004 | Harrison et al. | |
| 2001/0013085 A1 | 8/2001 | Yamamoto | |
| 2002/0059263 A1 | 5/2002 | Shima et al. | |
| 2002/0059307 A1 | 5/2002 | Tomita et al. | |
| 2002/0147734 A1* | 10/2002 | Shoup et al. | 707/200 |
| 2002/0169792 A1 | 11/2002 | Perinet et al. | |
| 2003/0158873 A1* | 8/2003 | Sawdon et al. | 707/204 |

FOREIGN PATENT DOCUMENTS

JP         2001312483         11/2001

\* cited by examiner

*Primary Examiner*—Sam Rimell
*Assistant Examiner*—Rezwanul Mahmood
(74) *Attorney, Agent, or Firm*—Mattingly, Stanger, Malur & Brundidge, P.C.

(57) ABSTRACT

A storage system, method and system for storing an original file and at least one format converted file of the original file. The storage system includes a storage medium and a file conversion unit which, in response to a request to store an original file, converts the original file to at least one format converted file. The file conversion unit alternatively could be external of the storage system forming a storage system. The storage system stores the original file and the at least one format converted file on said storage medium and manages a relationship between the original file and the format converted file to permit retrieval of either of the original file and the format converted file.

27 Claims, 13 Drawing Sheets

STORAGE SYSTEM STORING A FILE WITH MULTIPLE DIFFERENT FORMATS AND METHOD THEREOF

BACKGROUND OF THE INVENTION

The present invention relates generally to techniques for long term data archiving in a storage system. More particularly the present invention relates to a storage system and method for storing an original file and at least one format converted file of the original file and managing a relationship between the original file and the format converted file.

Conventionally, data stored in a storage system is stored in a single file format as set by the application program which requested such storage. Recently the need for long term data archiving has increased. This need has been made more acute, for example, by the passage of various regulations. These regulations include, for example, Regulations like SEC (Securities and Exchange Act) and 21 CFR (Code of Federal Regulations) Part 11 of the Food and Drug Administration act. These regulations require regulated companies to keep data for a long term.

The problems with such long term data archiving include, for example, data corruption and un-availability of the application program used to read and/or manipulate the archived data.

Data corruption occurs due to the fact that data on a storage media can change because the media upon which it is stored has a finite life span. Other reasons that can cause data corruption include the fact that the media upon which it is stored may come near some type of radiation that effects the physically recorded data on the media.

Un-availability of applications occurs due to the fact that an application program that reads and/or manipulates the archived data may not be available in the future because the software vendor may not continue supporting the application program or the vendor may have become bankrupt.

Thus, there is a need for a storage system for storing an original file and at least one format converted file of the original file and managing a relationship between the original file and the format converted file to effect long term archiving.

SUMMARY OF THE INVENTION

The present invention provides an apparatus, method and system for storing an original file and at least one format converted file of the original file to permit retrieval of either of the original or the at least one format converted files.

Particularly the present invention provides a storage system which includes a storage medium and a file conversion unit which, in response to a request to store an original file, converts the original file to at least one format converted file. The storage system stores the original file and the at least one format converted file on said storage medium and manages a relationship between the original file and the format converted file to permit retrieval of either of the original file and the format converted file.

The present invention also provides a method which is implemented in the storage system. The method includes, in response to a request to store an original file, converting the original file to at least one format converted file, storing the original file and the at least one format converted file on the storage medium, and managing a relationship between the original file and the format converted file to permit retrieval of either of the original file and the format converted file.

The present invention further provides a system which includes a storage system having a storage medium and a file conversion unit which is external of the storage system and is connected to the storage system by for example a network. The file conversion unit, in response to a request to store an original file, converts the original file to at least one format converted file. The storage system stores the original file and the at least one format converted file on the storage medium and manages a relationship between the original file and the format converted file to permit retrieval of either of the original file and the format converted file.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides a storage system which includes a storage medium and a file conversion unit which, in response to a request to store an original file, converts the original file to at least one format converted file. The storage system stores the original file and the at least one format converted file on the storage medium and manages a relationship between the original file and the format converted file to permit retrieval of either of the original file and the format converted file.

The present invention also provides a method which is implemented in the storage system. The method includes, in response to a request to store an original file, converting the original file to at least one format converted file, storing the original file and the at least one format converted file on the storage medium, and managing a relationship between the original file and the format converted file to permit retrieval of either of the original file and the format converted file.

The present invention further provides a system which includes a storage system having a storage medium and a file conversion unit which is external of the storage system and is connected to the storage system by for example a network. The file conversion unit, in response to a request to store an original file, converts the original file to at least one format converted file. The storage system stores the original file and the at least one format converted file on the storage medium and manages a relationship between the original file and the format converted file to permit retrieval of either of the original file and the format converted file.

Figure 1:
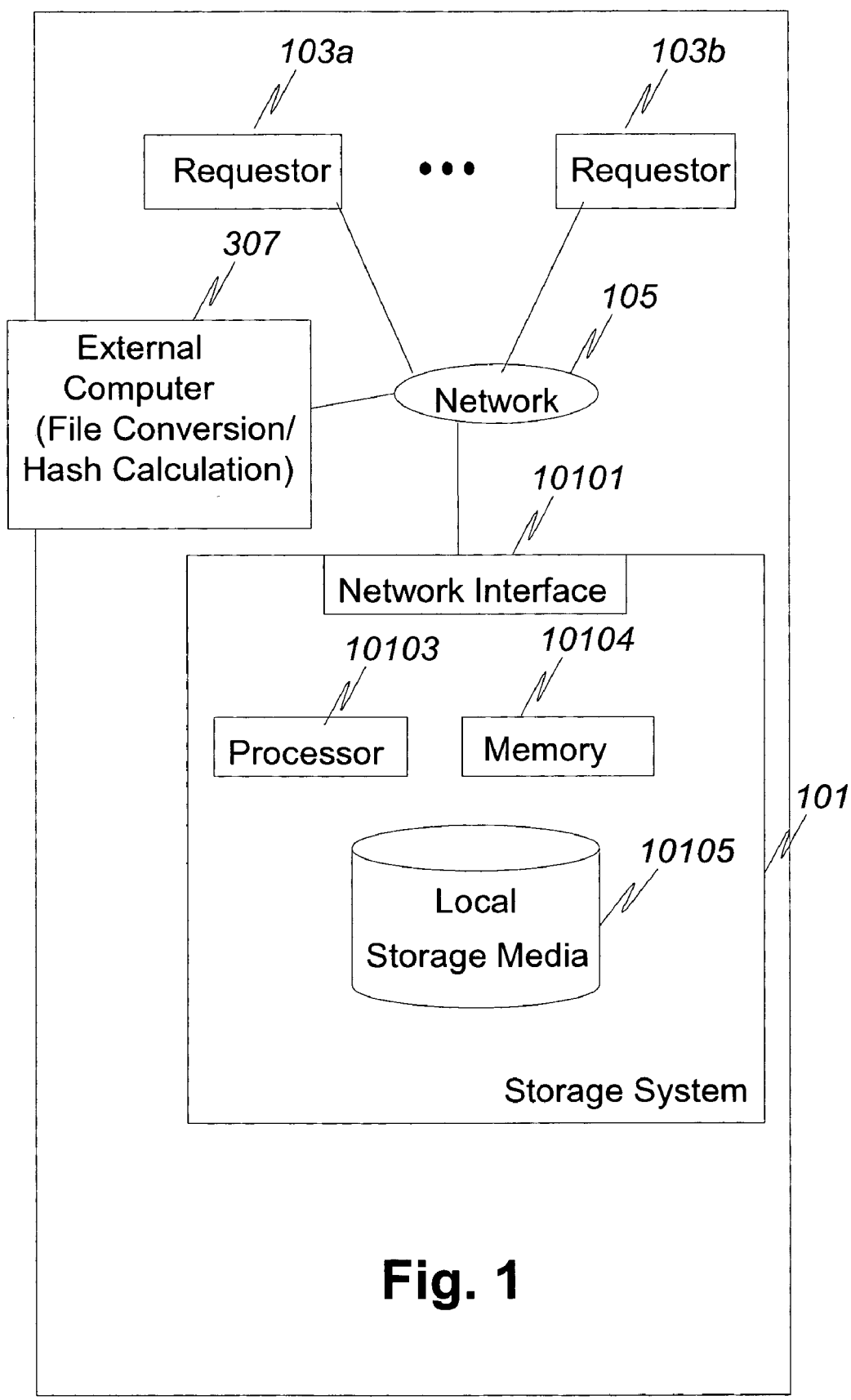
FIG. 1 is a diagram for explaining a storage system with an external computer for file conversion according to the present invention.

As illustrated in FIG. 1 the present invention provides a system which includes a storage system 101, requesters 103a and 103b, a network 105 and a file conversion function implemented by an external computer 307.

The storage system 101 of the present invention stores and retrieves files. The storage system 101 includes a network interface 10101 for connecting the storage system 101 to the network 105, a processor 10103 for performing various functions by executing a program, a memory 10104 which stores, for example, a program to be executed by the processor 10103, and a (local) storage media 10105 for storing files.

The external computer 307 converts a format of a file from a first format to a second format and calculates a hash value of a file in response to a request from a storage system 101. The external computer 307 is connected to a network 105.

Figure 2:
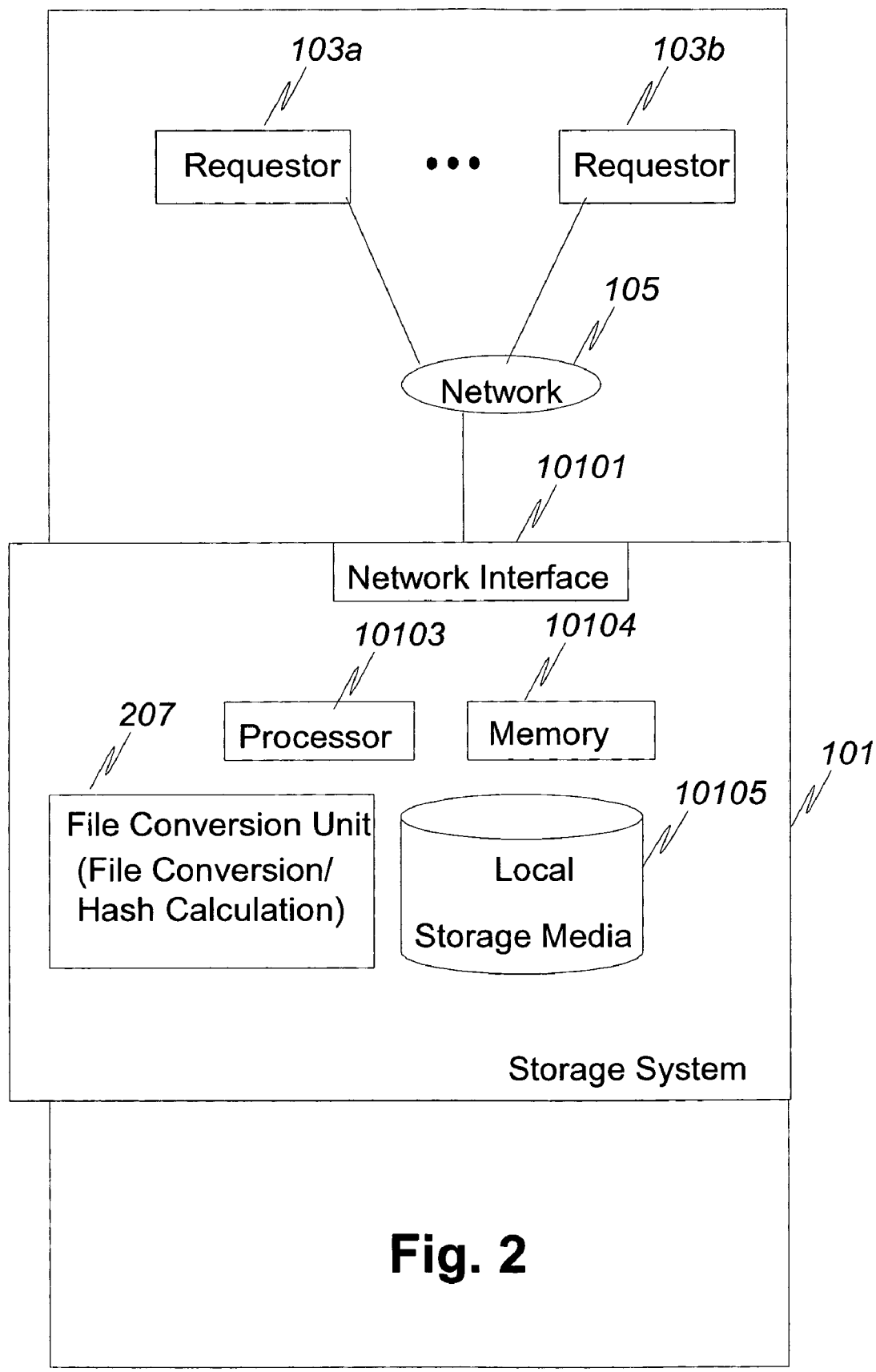
FIG. 2 is a diagram for explaining a storage system with an internal file conversion unit for file conversion according to the present invention.

Alternatively, as illustrated in FIG. 2, the file conversion function can be implemented internally in the storage system 101 by a file conversion unit 207 included in the storage system 101 or by the processor 10103. The file onversion unit 207 or the processor 10103, similar to the external computer 307, converts a format of a file from a first format to a second format and calculates a hash value of a file in response to a request for file conversion.

The requesters 103a, and 103b are also each connected to the network 105 and can create and update files stored on the storage system 101. Specifically, each requestor 103a,b can request the storage system 101 to perform various functions including storing files on the storage media 10105, retrieving files from the storage media 10105, converting files to be stored on or retrieved from the storage media 10105 from a first file format to a second file format, etc.

The storage system 101, in response to a request from a requestor 103a,b to convert a file from a first file format to a second file format, sends a request to the external computer 307 or the file conversion unit 207 requesting the external computer 307 or the file conversion unit 207 to perform the file conversion function. The external computer 307 or the file conversion unit 207 performs the file conversion function thereby converting the file from the first file format to the second file format, and sends the converted file of the second file format to the storage system 101 for storage therein.

It should be noted that communications between the requestors 103a,b, the external computer 307 and the storage system 101 can be performed via the network 105 (Ethernet) using, for example, the Transport Control Protocol/Internet Protocol (TCP/IP).

The present invention provides that the storage system 101 can have various capabilities. These capabilities include:

(1) Store a file with multiple formats. The storage system stores an original file and one or more format-converted files of the original file and manages a relationship of the original file and the format-converted files.

(2) Stores a format list table (Table 1) which lists formats of a specified file. The storage system provides a list of formats of the specified file.

TABLE 1

Format List Table

| File Name | file1 |
|---|---|
| Directory | /home/dir1/ |
| Formats | txt, pdf, jpg |

As per the Table 1 above, for example, a file named "file1" at the directory of "/home/dir1" is stored in three different formats, "txt", "pdf", and "jpg."

(3) Retrieve a file by specifying a file format. The storage system retrieves a file that has the specified file format.

(4) Manage a format-conversion table (Table 2). The storage system has a format-conversion table which is used in managing a relationship of the original file and the format-converted files. The format-conversion table shows which file format can be converted to which file format. For each conversion, the table shows if the storage system has a program that processes the conversion internally or if the storage system needs to ask an external computer to process the conversion. If the storage system processes it internally, the table indicates a name of a program. If an external computer processes it, the table indicates a name of the external computer.

TABLE 2

Format Conversion Table

| # | Format A | Format B | Program |
|---|---|---|---|
| 1 | Txt | Pdf | progA |
| 2 | Pdf | Txt | progB |
| 3 | Txt | Jpg | serverC |

As per Table 2 a file conversion program "progA" converts a file having a file format "txt" to a new file having a file format "pdf". Further, a file conversion program "progB" converts a "pdf" file to a "txt" file. Thus, "txt" and "pdf" files are re-convertible file formats. To convert a file from "txt" to "jpg", an external computer (server) "serverC" could, for example, be called by the storage system.

(5) Converts a file from a first file format to a second file format. A requestor 103a,b requests the storage system 101 to convert a format of a stored file to an another file format or a scheduler in the storage system 101 initiates a format conversion. The scheduler manages a format conversion scheduler table (Table 3) that shows which file format is converted to which file format at which timing. The storage system looks at the format-conversion table and knows which apparatus conducts the conversion. If it is the storage system 101 itself, the storage system converts a format of a file to an another format, stores the format-converted file and manages a relationship between the original file and the format-converted file. If it is the external computer 307, the storage system 101 requests the external computer 307 to convert a format of a file to another format and the storage system 101 stores the format-converted file and manages a relationship between the original file and the format-converted file.

TABLE 3

Format Conversion Scheduler Table

| # | Format A | Format B | Timing |
|---|----------|----------|--------|
| 1 | Txt | Pdf | timeA |
| 2 | Pdf | Txt | timeB |
| 3 | Txt | Jpg | timeC |

As per Table 3 a file conversion converting a file having a format "txt" to a new file having a file format "pdf" is conducted at "timeA" using "progA". Further, a file conversion converting a "pdf" file to a "txt" file is conducted at "timeB" using "progB". Still further, a file conversion converting a "txt" file to a "jpg" file is conducted at "timeC" using the external computer "serverC".

(6) Calculate hash values of stored files. The storage system 101 can calculate a hash value of a file and store the value with the file. Hash values for both an original file and its format-converted files are calculated. The external computer 307 can calculate hash values instead of the storage system 101 to reduce load on the processor 10103 of the storage system 101.

(7) List files in a hash value check table (Table 4) for which the hash values have been checked. The storage system can check hash values of an original file and its format-converted files. The storage system provides a list in the hash value check table of files with their respective status based on the check including Status A where both an original file and its format-converted files are unchanged, Status B where only an original file is unchanged, Status C where an original file has been changed and at least one of its format-converted files are unchanged and the unchanged format-converted file can be re-converted to an original format, Status D where an original file has been changed and at least one of its format-converted files are unchanged and the unchanged format-converted file can't be re-converted to an original format, and Status E where both an original file and its format-converted files are changed.

TABLE 4

Hash Value Check Table

| file names | formats | hash check | status |
|------------|---------|------------|--------|
| file1 | jpg | OK | Status A |
| | gif | OK | |
| file2 | txt | OK | Status B |
| | pdf | OK | |
| | jpg | NO | |

TABLE 4-continued

Hash Value Check Table

| file names | formats | hash check | status |
|------------|---------|------------|--------|
| file3 | mov | NO | Status C |
| | avi | OK | |
| file4 | doc | NO | Status D |
| | pdf | OK | |
| file5 | txt | NO | Status E |
| | jpg | NO | |

As per Table 4 the file named "file1" has files with two file formats "jpg" and "gif" and their hash values passed the hash value check. Thus, the status of "file1" is Status A, that means an original file and its format-converted files are unchanged. Further, "file2" has files with three file formats "txt", "pdf" and "jpg" and their hash values passed the hash value check with the exception of the hash value check for "jpg". Thus, the status of "file2" is Status B, that means only an original file not its format-converted files is unchanged. Still further, "file3" has files with two file formats "mov" and "avi" and their hash values passed the hash value check with the exception of the hash value check for "mov". Thus, the status of "file3" is Status C, that means an original file has been changed and at least one of its format-converted files are unchanged and the unchanged format-converted file can be re-converted to an original format. Still further yet, "file4" has files with two file formats "doc" and "pdf" and their hash values passed the hash value check with the exception of the hash value check for "doc". Thus, the status of "file4" is Status D, that means an original file has been changed and at least one of its format-converted files are unchanged and the unchanged format-converted file can't be re-converted to an original format. Even further yet, "file5" has files with two file formats "txt" and "jpg" and their hash values did not pass the hash value check. Thus, the status of "file5" is Status E, that means both an original file and its format-converted files are changed.

(8) Store files to the same storage media or an independent storage media. The storage system stores an original file and its format-converted files to same storage media or two or more independent storage media. The independent storage media are local storage devices attached to the storage system and/or remote storage devices accessed via a network and/or a Write Once Read Many (WORM) media. A storage media can be specified for each file and each format.

The present invention provides input/output (I/O) interfaces which operate as processes/procedure between requestors 103*a,b* and the storage system 101 to accomplish various tasks including, for example, store an original file to the storage system 101, configure a format-conversion table, initiate a format conversion of a file, get a list of formats of a file, get a list of a directory with a hash check, read a file by specifying a format, initiate a hash check of the specified file, and configure which file and which format of a file is stored on which storage media. A more detailed discussions of these I/O interfaces is provided below.

Figure 3:
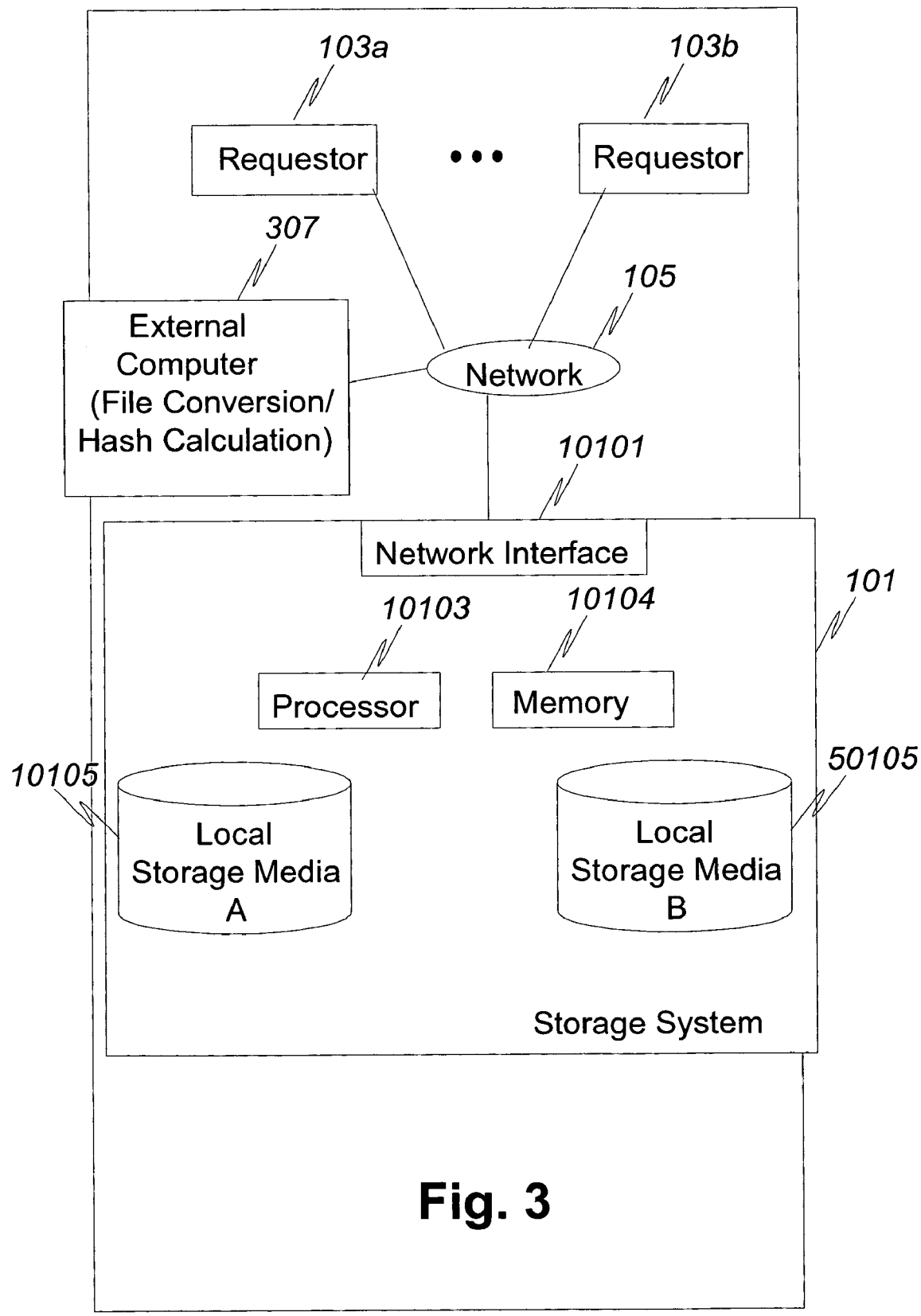
FIG. 3 is a diagram for explaining a storage system having multiple local storages and an external computer for file conversion according to the present invention.

As illustrated in FIG. 3 the present invention provides a system, similar to that illustrated in FIG. 1, having a storage system 101, requesters 103*a* and 103*b*, a network 105 and a file conversion function implemented by an external computer 307. The storage system 101 includes a processor 10103, a memory 10104, and a plurality (multiple) of local storage media 10105 and 50105. As per the present invention the storage system 101 stores an original file and its format-converted files to the same storage media or to separate (independent) storage media A 10105 or storage media B 50105. The independent storage media A and B 10105 and 50105 respectively, as shown in FIG. 3 are local storage devices attached to the storage system 101.

Figure 4:
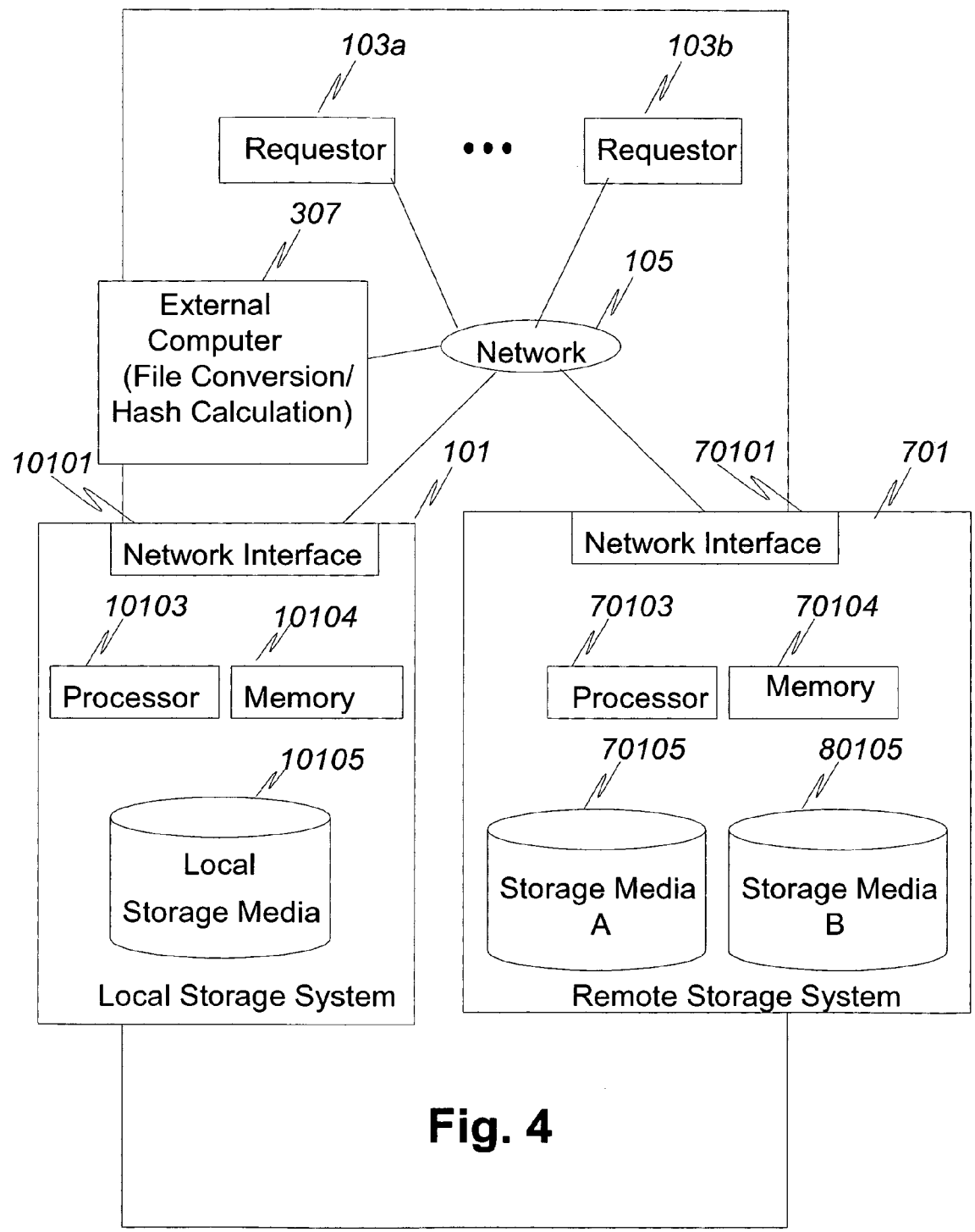
FIG. 4 is a diagram for explaining a storage system having multiple remote storages and an external computer for file conversion according to the present invention.

The present invention as illustrated in FIG. 4 can also be implemented across a local storage system 101 and a remote storage system 701 of a replication pair. The local storage system 101 includes elements the same as that shown in FIG. 1. The remote storage system 701 includes a network interface 70101 for connecting the storage system 701 to the network 105, a processor 70103 for performing various functions by executing a program, a memory 70104 which stores, for example, a program to be executed by the processor 70103, and a plurality (multiple) of storage media A 70105 and storage media B 80105 each for storing files. As per the present invention the storage system 701 stores an original file and its format-converted files to the same storage media or to separate (independent) storage media A 70105 or storage media B 80105.

The system as illustrated in FIG. 4 stores a part of the files into one or more remote storage systems. Data are stored in storage media of local storage system 101 first and then the local storage system 101 moves the stored data to storage media of remote storage system 701 via a network 105 and network interfaces 10101, 70101. Examples of a remote storage system are a file server or a network attached storage (NAS) and internet small computer serial interface (iSCSI) storage. In this case, the storage system and the remote storage system are connected to an Ethernet. Another example is a Fibre Channel (FC) storage. In this case, the storage system and the remote storage system are connected via an FC network that isn't shown in FIG. 4 and is a different network from a network 105.

Figure 5:
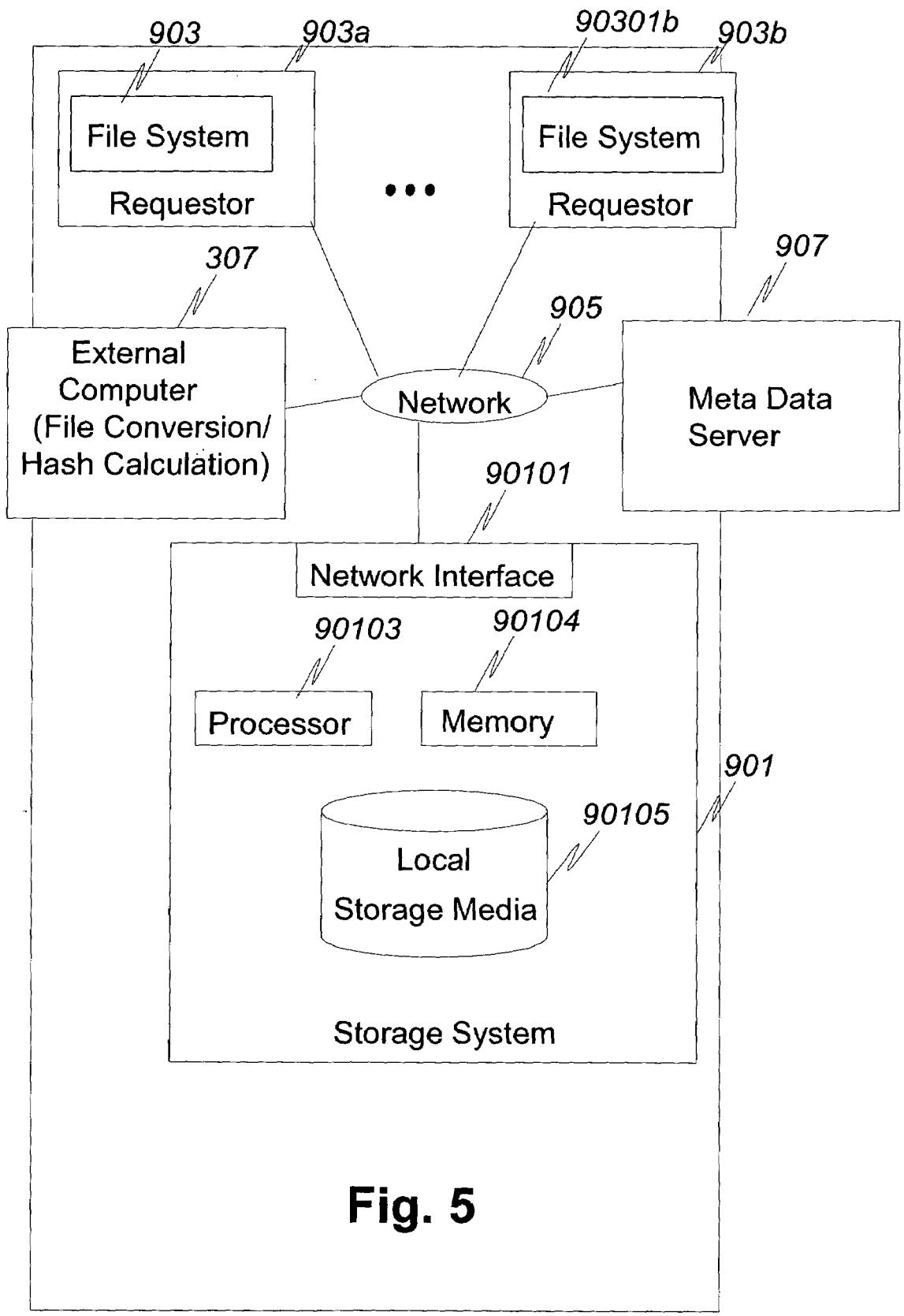
FIG. 5 illustrates a file system based implementation according to the present invention.

FIG. 5 illustrates a file system based implementation of the present invention having a storage system 901 which stores and retrieves files and has many of the above described capabilities as the storage system 101 illustrated in FIG. 1. Examples of such a storage system according to this implementation are a file server, FC storage, ISCSI storage, Object Storage Device (OBD). The requesters 903*a* and 903*b* performs the same functions as the requestors 103*a* and 103*b* illustrated in FIG. 1.

The External computer 307 is the same as that illustrated in FIG. 1. The file system based implementation of the present invention as illustrated in FIG. 5 further includes a meta data server 907 which has capabilities similar to the storage system 101 as described above and illustrated in FIG. 1, but files are stored in one or more storage systems 901. A requestor 903*a* or 903*b* writes and reads files in the storage system 901 via a network 905. The meta data server 901 provides I/O interfaces as described above and in more detail below.

File systems 90301*a* and 90301*b* are, for example, respectively provided in the requestors 9031 and 903*b*. Each file system 90301*a*, 90301*b* provides a redirection of I/O requests from an application running on the requestor 903*a*, 903*b*. If the request is to write a file or read a file, the file system 90301*a*, 90301*b* writes or read the file to or from the storage system 901 via the network 905. For the other requests, the file system 90301*a*, 90301*b* sends these other requests to the meta data server 907.

As illustrated in FIG. 5 the network 905 connects the storage system 901, requestors 903*a* and 903*b*, an external computer 307 and a meta data server 907. If the storage system 901 is a FC storage system, the requesters 90301*a*, 90301*b* and the storage system 901 are connected via a FC network.

As briefly described above, the present invention provides I/O interfaces which operate as a processes/procedures between requestors 103*a*,*b* and the storage system 101 to accomplish various tasks including, for example, store an original file to the storage system 101, configure a format-conversion table, initiate a format conversion of a file, get a list of formats of a file, get a list of a directory with a hash check, read a file by specifying a format, initiate a hash check of the specified file, and configure which file and which format of a file is stored on which storage media.

Figure 6:
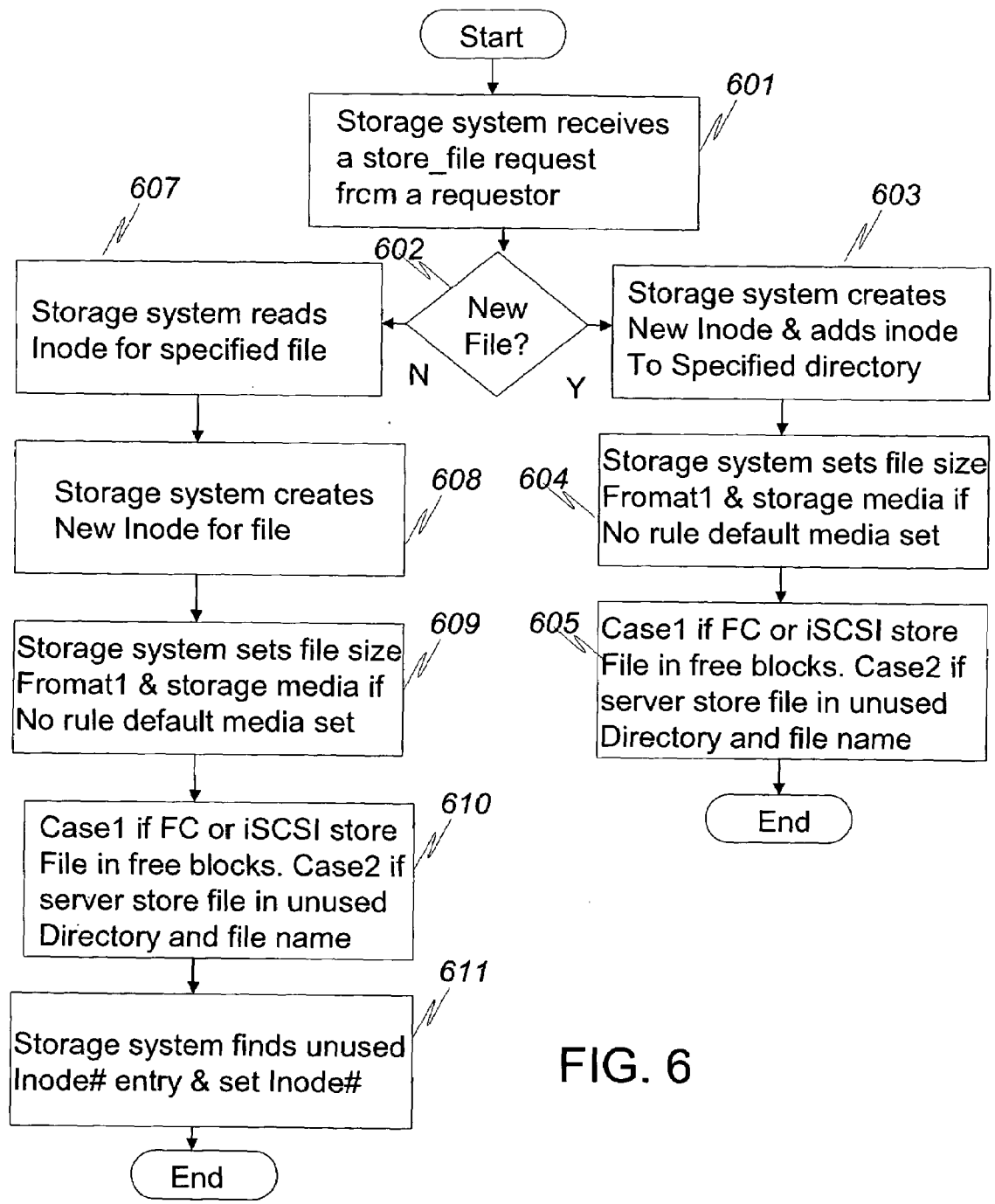
FIG. 6 is a flowchart illustrating the implementation of the I/O interface to store an original file to the storage system according to the present invention.

An implementation of the I/O interface which operates as a process/procedure to store an original file to the storage system 101 of the present invention is illustrated, for example, in FIG. 6, wherein the following specification and related data structures are used.

TABLE 5

Specification of I/O Interface Store an Original File to Storage System

| | | |
|---|---|---|
| Prototype | | store_file (file, file_name, format, directory) |
| Parameters | file | A file to store |
| | file_name | A file name of the file |
| | format | A format of the file |
| | directory | A directory where the file is stored |
| Description | | Store the specified file with a format in the specified directory of the storage system. |

As per Table 5 above the prototype of the I/O interface which operates as a processes/procedure to store an original file to the storage system 101 is store_file (file, file_name, format, directory). The parameters of the I/O interface include file a file to be stored, file_name the file name of the file, format the format of the file, and directory a directory where the file is to be stored. The Description of the I/O interface as has been set forth above is to store the specified file with a format in the specified directory of the storage system.

The related data structures used to implement this I/O interface includes, for example, inodes. Inodes are data structures that, for example, contain information about files in Unix file systems. Each file has an inode and is identified by an inode number (i-number) in the file system where it resides. Inodes provide important information on files such as user and group ownership, access mode (read, write, execute permissions) and type. Inodes are created when a file system is created. There are a set number of inodes, which indicate the maximum number of files the system can hold. A file's inode number can be found using the ls -i command, while the ls -I command will retrieve inode information.

TABLES 6A and B

Examples of Inodes

| Inode of Original File | | Inode of Format-Converted File | |
|---|---|---|---|
| Inode# | 2 | inode# | 3 |
| file name | text1 | file name | N/A |
| file size | 32 Kbyes | file size | 63 Kbyes |
| hash value | ndsau38s | hash value | 82jdsos0d |
| format1 | Txt | format1 | pdf |

TABLES 6A and B-continued

Examples of Inodes

| | Inode of Original File | | Inode of Format-Converted File |
|---|---|---|---|
| storage media location | StorageB | storage media location | storageC |
| Inode# of format2 | 3 | inode# of format2 | N/A |
| Inode# of format3 | N/A | inode# of format3 | N/A |
| Inode# of formatn | N/A | inode# of formatn | N/A |

As per each of Tables 6A and B inode# is a unique identifier of an inode. File name is a file name of a file. File size is a size of a file. Format1 is a format of an original file. Storage media is a storage media in which a file is stored. In a case where the storage media is FC storage or ISCSI stoage, location is a list of disk blocks where a file is stored. In a case where the storage media is a file server, location is a set of a directory name and a file name where a file is stored. The inode# of each of format2 through formatn is an inode# of a format-converted file of this file. The inodes are stored in the local storage media of the storage system together with a bitmap table that shows which disk blocks are used and unused.

Implementation of this I/O interface is as illustrated in the flowchart of FIG. 6, where the storage system receives a store_file request from a requester (Step 601). If this a new file, go to Step 3, if not, go to step 7 (Step 602). The storage system creates a new inode and adds the inode into an inode of the specified directory (Step 603). The storage system sets a file name, a file size, format1 and a storage media in the inode. If there is no file storing rule applied to this file, the default storage media, for example, a local storage media attached to the storage system, is set (Step 604). (Case 1) If the storage media is FC storage or iSCSI storage, the storage system allocates a list of free disk blocks from the storage media and stores the received file into the disk blocks. (Case 2) If the storage media is a file server, the storage system finds an unused set of a directory name and a file name from the file server and stores the received file in the directory with the file name in the file server and then sets the directory name and the file name in a location entry of the inode (Step 605). The end of processing the request for a new file is then reached.

If the request is not for a new file, the storage system reads an inode for a file specified in the request. This inode is called an original inode (Step 607). The storage system creates a new inode for the received file. This inode is called a secondary inode (Step 608). The storage system sets a file size, format1 and a storage media in the secondary inode. If there is no file storing rule applied to this file, the default storage media is set (Step 609). (Case 1) If the storage media of the secondary inode is FC storage or iSCSI storage, the storage system allocates a list of free disk blocks from the storage media and stores the received file into the disk blocks. Case 2) If the storage media of the secondary inode is a file server, the storage system finds a unused set of a directory name and a file name from the file server and stores the received file in the found directory with the found file name in the file server and then sets the directory name and the file name in a location entry of the secondary inode. (Step 610). The storage system finds a unused entry of inode# of format in the original inode and sets inode# of the secondary inode into the entry (Step 611). The end of processing the request for a file that is not new is then reached.

Figure 7:
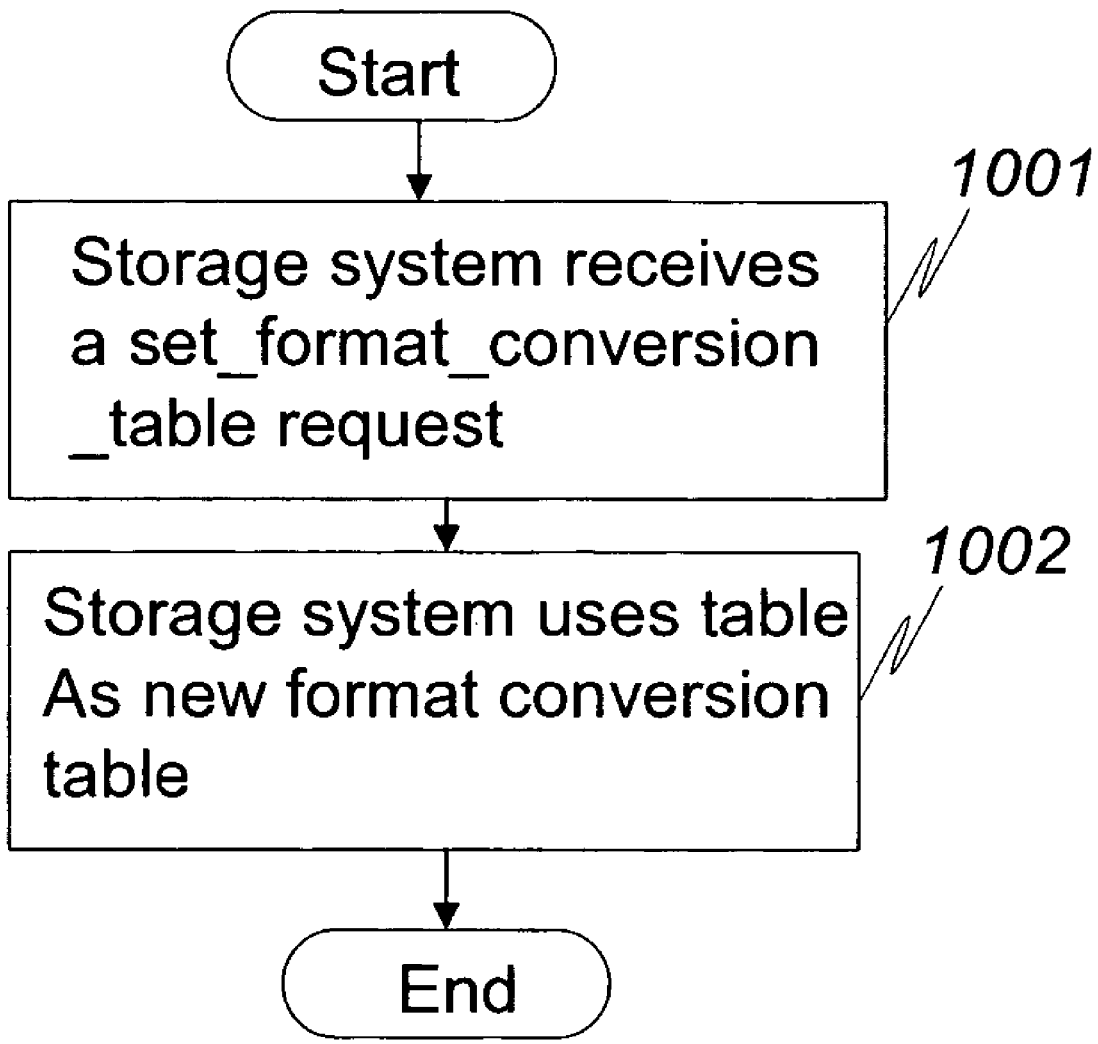
FIG. 7 is a flowchart illustrating the implementation of the I/O interface to configure a format conversion table according to the present invention.

An implementation of the I/O interface which operates as a process/procedure to configure a format conversion table of the present invention is illustrated, for example, in FIG. 7, wherein the following specification and related data structures are used.

TABLE 7

Specification of I/O Interface to Configure a Format Conversion Table

| Prototype | | set_format_conversion_table (table) |
|---|---|---|
| Parameters | table | A format-conversion table |
| Description | | Set a format conversion table to the storage system. |

As per Table 7 above the prototype of the I/O interface which operates as a processes/procedure to configure a format conversion table of the present invention is set_format_conversion_table (table). The parameters of the I/O interface include table, specifically a format-conversion table. The Description of the I/O interface as has been set forth above is to set a format conversion table to the storage system.

The related data structures used to implement this I/O interface includes, for example, Table 3 as set forth above.

Implementation of this I/O interface is as illustrated in the flowchart of FIG. 7, where the storage system receives a set_format_conversion_table request from a requestor (Sep 1001). The storage system uses the received table as a new format conversion table (Step 1002). The end of processing the request is then reached.

Figure 8:
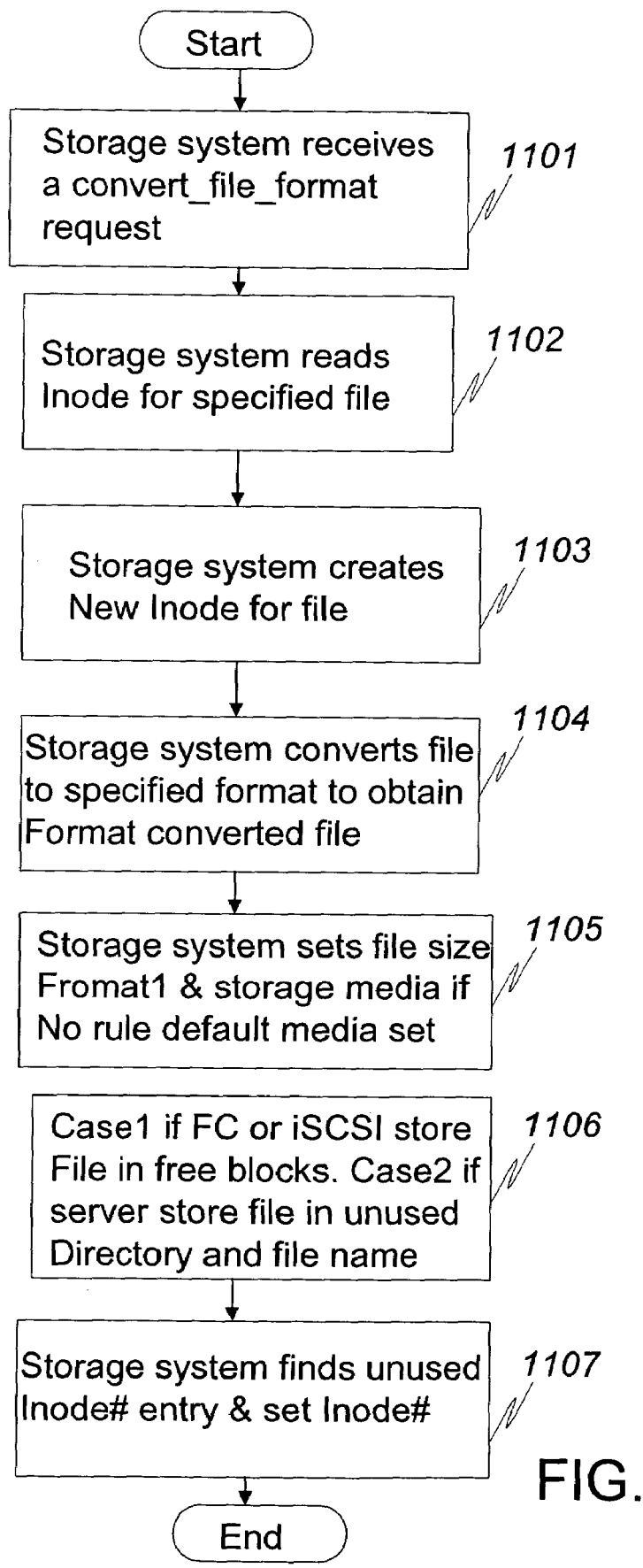
FIG. 8 is a flowchart illustrating the implementation of the I/O interface to initiate format conversion of a file according to the present invention.

An implementation of the I/O interface which operates as a processes/procedure to initiate format conversion of a file of the present invention is illustrated, for example, in FIG. 8, wherein the following specification is used. There are no related data structures.

TABLE 8

Specification of I/O Interface Initiate Format Conversion of a File

| Prototype | | convert_file_format (file_name, directory, format) |
|---|---|---|
| Parameters | file_name | A file name of a file to convert its format |
| | directory | A directory where a file is being stored |
| | format | A format to which the file is converted |
| Description | | Convert the specified file in the specified directory to the specified format. The storage system stores both the original file and the format-converted file and manages its relationship. |

As per Table 8 above the prototype of the I/O interface which operates as a processes/procedure to initiate format conversion of a file of the present invention is convert_file_format (file_name, directory, format). The parameters of the I/O interface include file_name which is a file name of a file for which its format is to be converted, directory which is a directory where a file is being stored, and format which is a format to which the file is converted. The Description of the I/O interface as has been set forth above is to convert the specified file in the specified directory to the specified format. The storage system stores both the original file and the format-converted file and manages its relationship.

Implementation of this I/O interface is as illustrated in the flowchart of FIG. 8, where the storage system receives a convert_file_format request from a requestor (Step 1101). The storage system reads an inode for a file specified in the request. This inode is called an original inode (Step 1102). The storage system creates a new inode for a format-converted file. This inode is called a secondary inode (Step 1103). The storage system converts the specified file to the specified format and gets a format-converted file (Step 1104). The storage system sets a file size, format1 and a storage media in the secondary inode for the format-converted file. If there is no file storing rule applied to this file, the default storage media is set (Step 1105). (Case 1) If the storage media of the secondary inode is FC storage or iSCSI storage, the storage system allocates a list of free disk blocks from the storage media and stores the received file into the disk blocks. (Case 2) If the storage media of the secondary inode is a file server, the storage system finds a unused set of a directory name and a file name from the file server and stores the received file in the found directory with the found file name in the file server and then sets the directory name and the file name in a location entry of the secondary inode. (Step 1106). The storage system finds a unused entry of inode# of format in the original inode and sets inode# of the secondary inode into the entry (Step 1107). The end of processing the request is then reached.

With respect to the above described implementation of the I/O interface which operates as a processes/procedure to initiate format conversion of a file of the present invention, if there is an external computer that converts a format of a file, the storage system sends the file with an original format and a target format to the external computer and the external computer converts the format of the received file to the target format. The external computer then sends the format-converted file back to the storage system.

Figure 9:
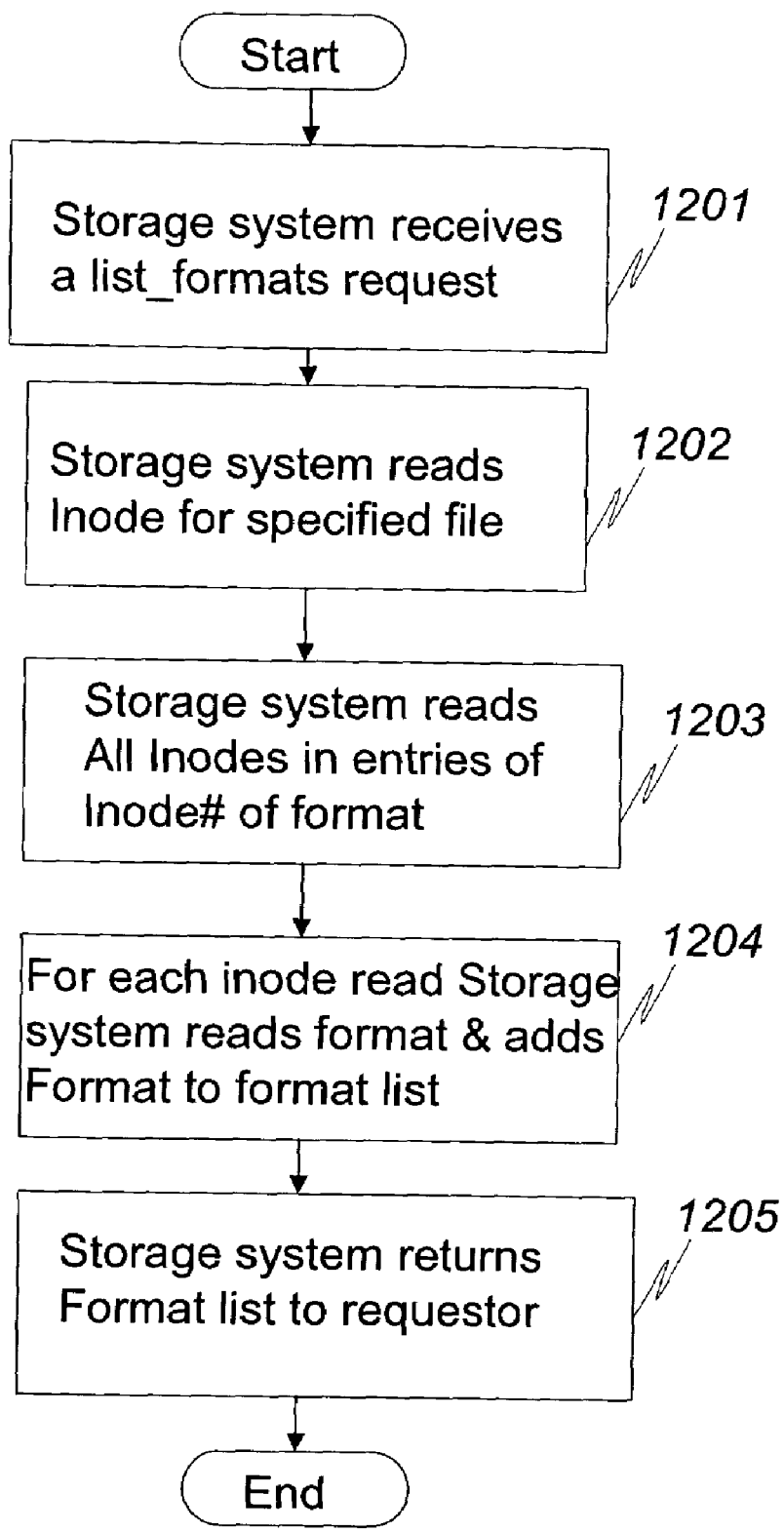
FIG. 9 is a flowchart illustrating the implementation of the I/O interface to get a list of formats of a file according to the present invention.

An implementation of the I/O interface which operates as a processes/procedure to get a list of formats of a file of the present invention is illustrated, for example, in FIG. 9, wherein the following specification and related data structures are used.

TABLE 9

Specification of I/O Interface Get Formats of a File

| Prototype | | list_formats (file_name, directory, list) |
|---|---|---|
| Parameters | file_name | A file name of a file |
| | directory | A directory of a file |
| | list | [Output] a list of formats with which a file is stored |
| Description | | Get a list of formats with which the specified file is stored. |

As per Table 9 above the prototype of the I/O interface which operates as a processes/procedure to get a list of formats of a file of the present invention is list_formats (file_name, directory, list). The parameters of the I/O interface include file_name which is a file name of a file for which a list of format is to be obtained, directory which is a directory where a file is being stored, and list which is the output of a list of formats with which a file is stored. The Description of the I/O interface as has been set forth above is to get a list of formats with which the specified file is stored.

The related data structures used to implement this I/O interface includes, for example, Table 1 as set forth above.

Implementation of this I/O interface is as illustrated in the flowchart of FIG. 9, where the storage system receives a list_formats request from a requestor (Step 1201). The storage system reads an inode of the specified file. This is called an original inode. (Step 1202). The storage system reads all of inodes in entries of inode# of format. These are called secondary inodes. (Step 1203). For each read inode, the storage system reads a format in the inode and adds the format into the format list (Step 1204). The storage system returns the format list to the requestor (Step 1205). The end of processing the request is then reached.

Figure 10:
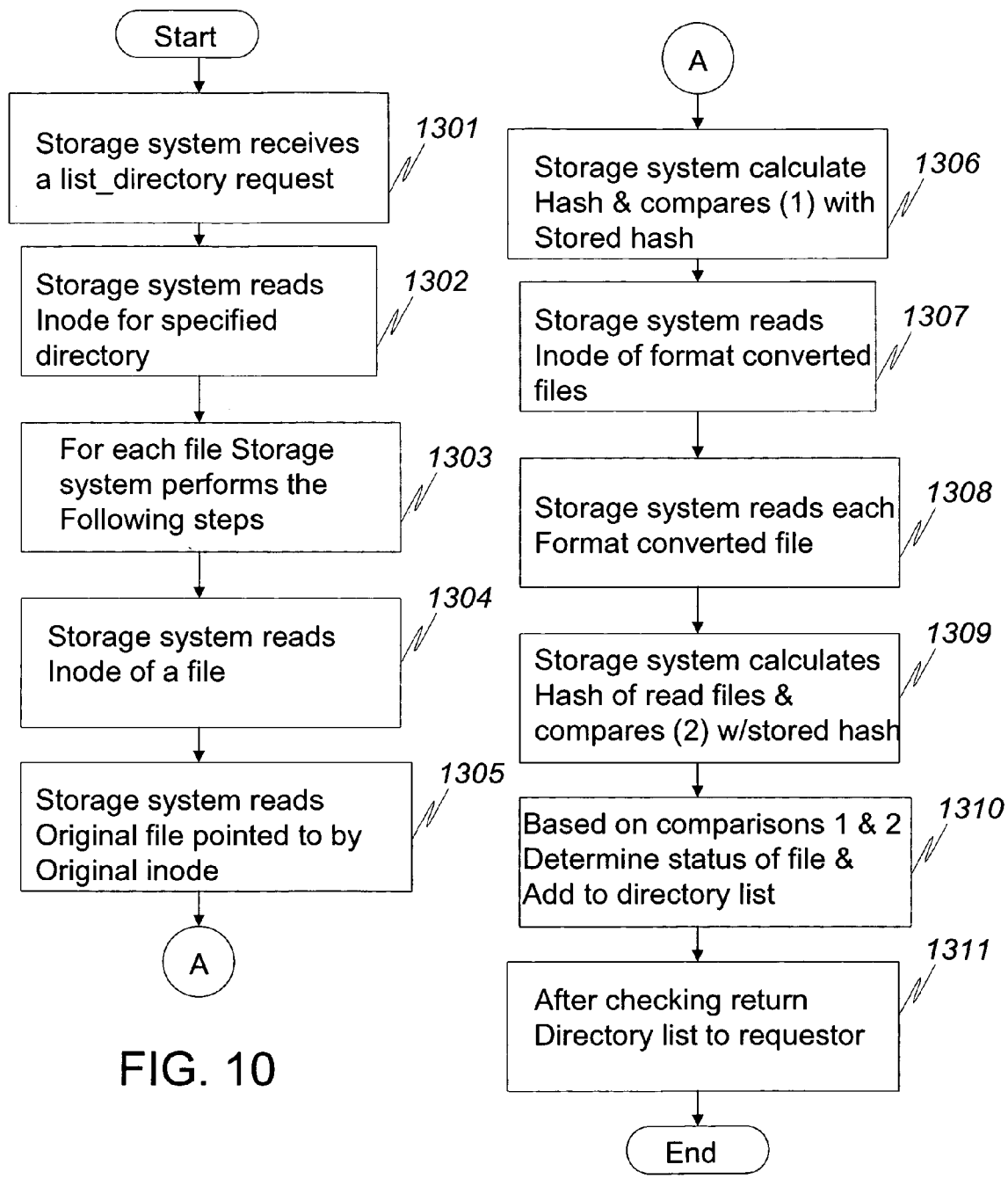
FIG. 10 is a flowchart illustrating the implementation of the I/O interface to get a list of a directory with hash check according to the present invention.

An implementation of the I/O interface which operates as a process/procedure to get a list of a directory with hash check of the present invention is illustrated, for example, in FIG. 10, wherein the following specification and related data structures are used.

TABLE 10

Specification of I/O Interface Get List of Directory With Hash Check

| Prototype | | list_directory (directory, list) |
|---|---|---|
| Parameters | directory | A directory to list |
| | list | [Output] a list of files in a directory |
| Description | | Get a list of files in the specified directory. The storage system checks hash values of files in the directory and indicates a status of the file. |

As per Table 10 above the prototype of the I/O interface which operates as a process/procedure to get a list of a directory with hash check of the present invention is list_directory (directory, list). The parameters of the I/O interface include directory which is a directory to where a list is being stored, and a list which is the output of a list of files in the directory. The Description of the I/O interface as has been set forth above is to get a list of files in the specified directory. The storage system checks hash values of files in the directory and indicates a status of the file.

The related data structures used to implement this I/O interface includes, for example, Table 4 as set forth above.

Implementation of this I/O interface is as illustrated in the flowchart of FIG. 10, where the storage system receives a list_directory request from a requestor (Step 1301). The storage system reads an inode of the specified directory (Step 1302). For each file in the directory, the storage system does the following steps 1304–1311 (Step 1303). The storage system reads an inode of a file. This is called an original inode. (Step 1304). The storage system reads an original file pointed to by the original inode (Step 1305). The storage system calculates a new hash value of the read file and compares it with the hash value stored in the original inode (Comparison 1) (Step 1306). The storage system reads each inode of format-converted files in the original inode. These are called secondary inodes. (Step 1307). The storage system reads each format-converted file pointed to by secondary inodes (Step 1308). The storage system calculates new hash values of the read files and compares them with the hash values stored in the secondary inodes (Comparison 2) (Step 1309). Based on the Comparison 1 and 2, the storage system determines the status of the original file and adds the result to the directory list (Step 1310). After finishing the checking all of files in the directory, the storage system returns the directory list to the requestor (Step 1311). The end of processing the request is then reached.

With respect to the above described implementation of the I/O interface which operates as a process/procedure to get a list of the directory with hash check of the present invention, if there is an external which calculates a hash value of a file, the storage system sends the file to the external computer and the external computer calculates the hash value of the received file. The external computer then sends the hash value back to the storage system.

Figure 11:
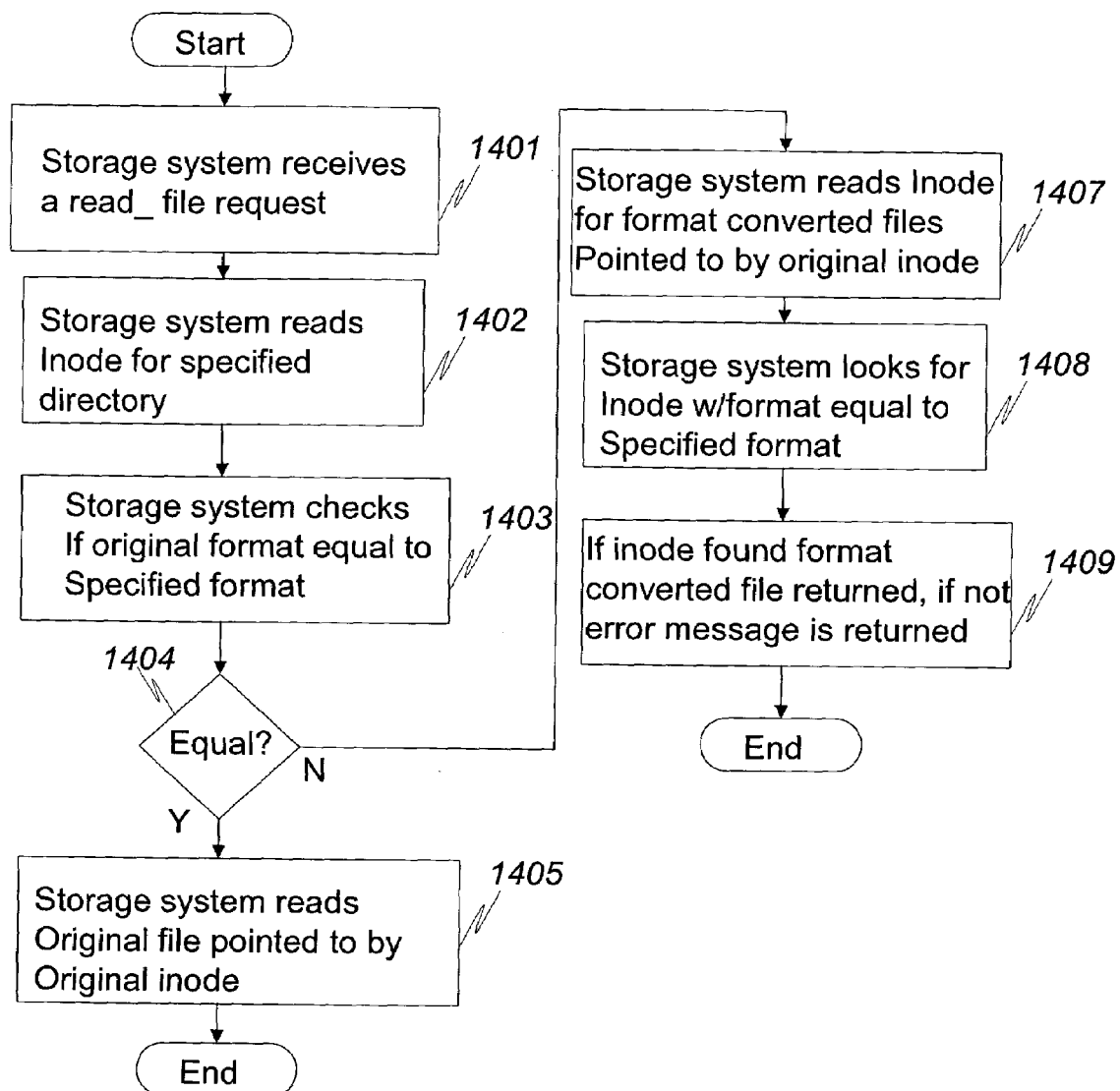
FIG. 11 is a flowchart illustrating the implementation of the I/O interface to read a file by specifying a format according to the present invention.

An implementation of the I/O interface which operates as a process/procedure to read a file by specifying a format of the present invention is illustrated, for example, in FIG. 11, wherein the following specification is used. There are no related data structures.

TABLE 11

Specification of I/O Interface Read A File By Specifying a Format

| | | |
|---|---|---|
| Prototype | | read_file (file, file_name, format, directory) |
| Parameters | file | [Output] A file to read |
| | file_name | A file name of the file |
| | format | A format of the file |
| | directory | A directory where the file is stored |
| Description | | Read a file with the specified format in the specified directory of the storage system. |

As per Table 11 above the prototype of the I/O interface which operates as a process/procedure to read a file by specifying a format of the present invention is read_file (file, file_name, format, directory). The parameters of the I/O interface include file which is and output of a file to read, file_name which is the file name of the file, format which is the format of the file, and directory which is a directory to where the file is being stored. The Description of the I/O interface as has been set forth above is to read a file with the specified format in the specified directory of the storage system.

Implementation of this I/O interface is as illustrated in the flowchart of FIG. 11, where the storage system receives a read_file request from a requestor (Step 1401). The storage system reads an inode of the specified file. This is called an original inode. (Step 1402). The storage system checks if the original format of the original inode is equal to the specified format in the request (Step 1403). If it is, go to Step 5. If not, go to Step 7. (Step 1404). The storage system reads the original file pointed to by the original inode and returns the file to the requestor (Step 1405). The end of processing of the request when the original format of the original inode is equal to the specified format in the request is then reached. When the original format of the original inode is not equal to the specified format in the request, the storage system reads inodes of format-converted files pointed by the original inode. These are called secondary inodes. (Step 1407). From the secondary inodes, the storage system looks for a secondary inode which's format is equal to the specified format in the request (Step 1408). If there is such a secondary inode, the storage system reads a format-converted file pointed by the secondary inode and returns the file to the requester. If there is not such a secondary inode, the storage system returns an error value to the requestor. (Step 1409). The end of processing of the request when the original format of the original inode is not equal to the specified format in the request is then reached.

Figure 12:
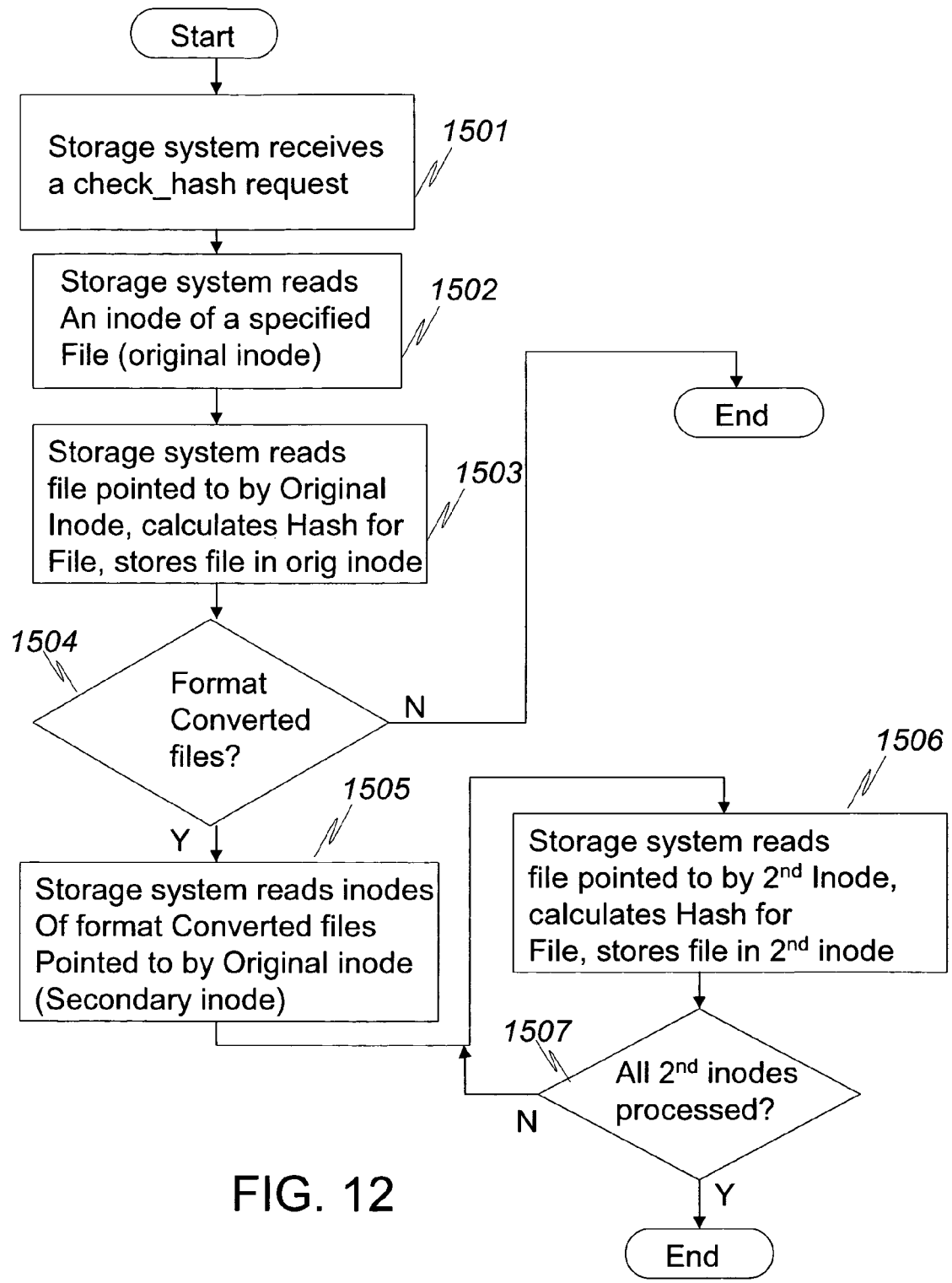
FIG. 12 is a flowchart illustrating the implementation of the I/O interface to calculate a hash value of a specified file according to the present invention.

An implementation of the I/O interface which operates as a process/procedure to calculate a hash value of a specified file of the present invention is illustrated, for example, in FIG. 12, wherein the following specification is used. There are no related data structures.

TABLE 12

Specification of I/O Interface Calculate a Hash Value of a Specified File

| | | |
|---|---|---|
| Prototype | | check_hash (file_name, format, directory) |
| Parameters | file_name | A file name of the file to check a hash |
| | format | A format of the file |
| | directory | A directory where the file is stored |
| Description | | Calculate a hash value of the specified file and store the value with the file. |

As per Table 12 above the prototype of the I/O interface which operates as a process/procedure to calculate a hash value of a specified file of the present invention is check_hash (file_name, format, directory). The parameters of the I/O interface include file_name which is the file name of the file upon whci a hash calculation is to be performed, format which is the format of the file, and directory which is a directory to where the file is being stored. The Description of the I/O interface as has been set forth above is to calculate a hash value of the specified file and store the value with the file.

Implementation of this I/O interface is as illustrated in the flowchart of FIG. 12, where the storage system receives a check_hash request from a requestor (Step 1501). The storage system reads an inode of the specified file. This is called an original inode. (Step 1502). The storage system reads an original pointed by the original inode and calculates a hash value of the read file and then stores the hash value into the original inode (Step 1503). If the file has format-converted files, go to step 5. If the file does not have format-converted files, the end of processing the request is reached. (Step 1504). The storage system reads inodes of format-converted files pointed to by the original inode. These are called secondary inodes. (Step 1505). For each secondary inode, the storage system reads a format-converted file pointed to by the secondary inode and calculates a hash value of the read file and then stores the hash value into the secondary inode (Step 1506). If all of secondary inodes have been processed, end of processing the request. If not, repeat Step 1506 (Step 1507).

With respect to the above described implementation of the I/O interface which operates as a process/procedure to calculate a hash value of a specified file of the present invention, if there is an external computer which calculates a hash value of a file, the storage system sends the file to the external computer and the external computer calculates the hash value of the received file. The external computer then sends the hash value back to the storage system.

Figure 13:
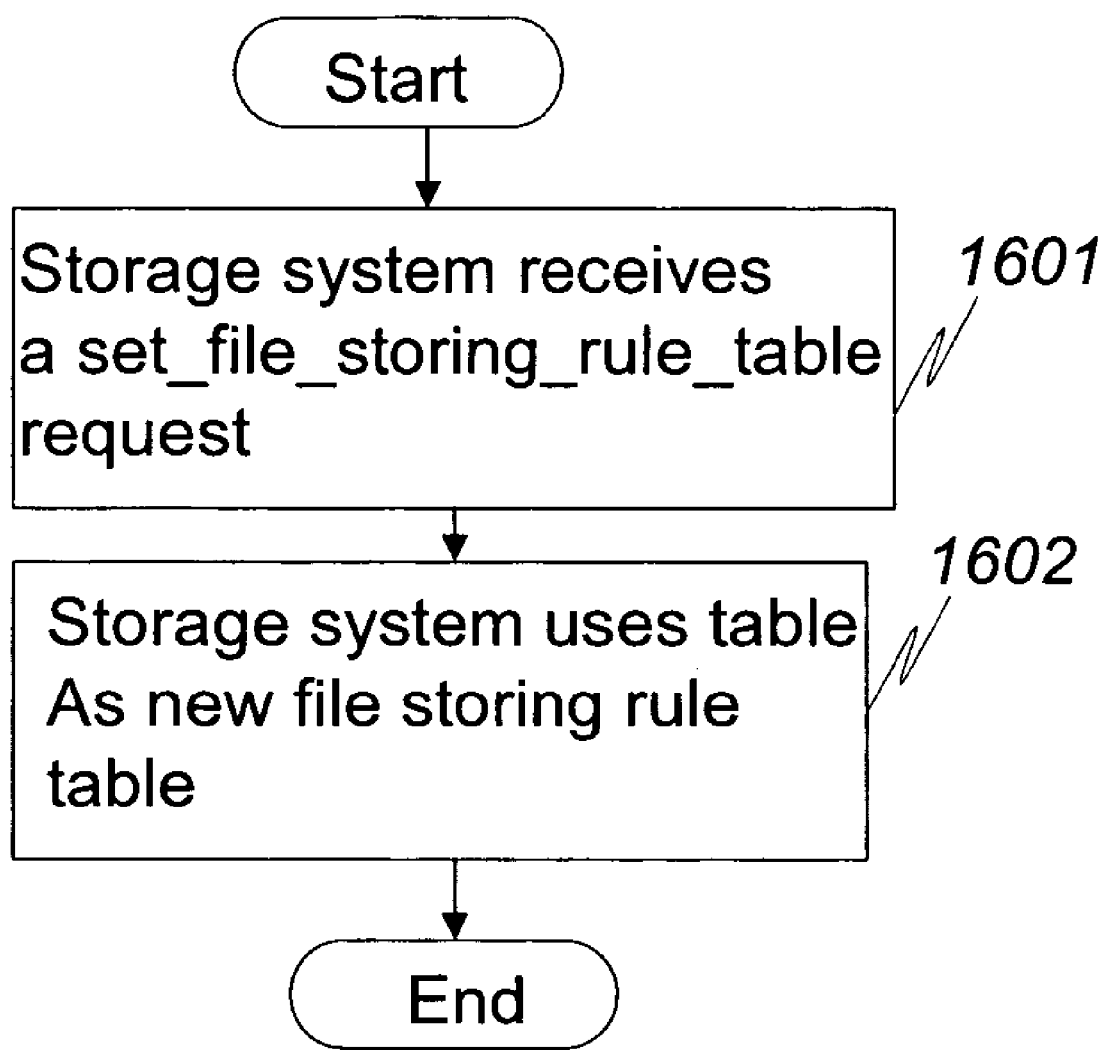
FIG. 13 is a flowchart illustrating the implementation of the I/O interface to configure which file and which format of a file is to be stored upon which storage media according to the present invention.

An implementation of the I/O interface which operates as a process/procedure to configure which file and which format of a file is to be stored upon which storage media of the present invention is illustrated, for example, in FIG. 13, wherein the following specification and related data structures are used.

TABLE 13

Specification of I/O Interface Configure Which File and Which Format of a File is to be Stored Upon Which Storage Media

| | | |
|---|---|---|
| Prototype | | set_file_storing_rule_table (table) |
| Parameters | table | A new file storing rule table |
| Description | | Set a new file storing rule table to the storage system. |

As per Table 13 above the prototype of the I/O interface which operates as a process/procedure to configure which file and which format of a file is to be stored upon which storage media of the present invention is set_file_storing_rule_table (table). The parameters of the I/O interface include table which is a new file storing rule table. The Description of the I/O interface as has been set forth above is to set a new file storing rule table to the storage system.

The related data structures used to implement this I/O interface includes, for example, a file rule storing table as set forth below.

TABLE 14

File Storing Rule Table

| Rules | File Name | Format | Directory | Storage Media |
|---|---|---|---|---|
| 1 | file1 | txt | /home/dir1/ | Storage A |
| 2 | | pdf | | Storage B |
| 3 | | | /home/dir2/ | Storage C |

According to the present invention as per Table 14 above, with respect to Rule1 the file named "file1" having the format "txt" under the directory "/home/dir1/" is to be stored in the storage media "storage A", with respect to Rule2 any files having the format "pdf" are to be stored in the storage media "storage B", and with respect to Rule3 any files under the directory "/home/dir2/" are stored in the storage media "storage C". Table 14 as set forth above merely gives some examples of file storing rules. Many other file storing rules can be used as would be apparent to one skilled in the art including, for example, storing a file at different locations on storage media of a storage system, on other storage media of the storage system, or on other storage media of a remote storage system which can be accessed via a network based on a format of the file or a directory in which files are located.

Implementation of this I/O interface is as illustrated in the flowchart of FIG. 13, where the storage system receives a set_file_storing_rule_table request from a requestor (Step 1601). The storage system uses the received table as a new file storing rule table (Step 1602). The end of processing the request is then reached.

Therefore, the present invention provides a storage system, method and system for storing an original file and at least one format converted file of the original file. The storage system includes a storage medium and a file conversion unit which, in response to a request to store an original file, converts the original file to at least one format converted file. The file conversion unit alternatively could be external of the storage system forming a storage system. The storage system stores the original file and the at least one format converted file on said storage medium and manages a relationship between the original file and the format converted file to permit retrieval of either of the original file and the format converted file.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A storage system for storing an original file and at least one format converted file of the original file comprising:
   a storage media; and
   a file conversion unit which, in response to a request to store an original file is configured to convert the original file to at least one format converted file,
   wherein said storage system is configured to store the original file and the at least one format converted file on said storage media, and is able to manage a relationship between the original file and the at least one format converted file to permit retrieval of either of the original file and the at least one format converted file,
   wherein said file conversion unit is configured to calculate a first hash value of the original file and a second hash value for each of the at least one format converted files, and
   wherein said storage system is configured by instructions to determine whether the original file has changed or whether the at least one format converted file has changed by reading one of said files, calculating a new hash value for the read file, and comparing said new hash value with a respective one of said first hash value if said original file is read, or comparing the new hash value with a corresponding second hash value if one of said format converted files is read.

2. A storage system according to claim 1, wherein the relationship between the original file and the format converted file is managed by including a first inode that includes the first hash value stored therein, said first inode further including, for each at least one format converted file, an inode number of a second inode that stores the second hash value and that points to a corresponding format converted file.

3. A storage system according to claim 1, wherein said file conversion unit is external of said storage system.

4. A storage system according to claim 1,
   wherein said first hash value is used to determine whether the original file has changed by
   reading the original file pointed to by a first inode that stores the first hash value,
   calculating a first new hash value from the original file as read, and
   comparing the, first hash value stored in the first inode with the first new hash value to determine whether the original file has changed; and
   wherein said second hash value is used to determine whether the format converted file has changed by
   reading a second inode listed in said first inode for said format converted file,
   reading the format converted file pointed to by the second inode,
   calculating a second new hash value from the format converted file as read, and
   comparing the second hash value stored in the second inode with the second new hash value to determine whether the format converted file has changed.

5. A storage system according to claim 1, wherein a directory list is maintained indicating a corresponding relation between the original file, formats to which the original file has been converted, information based on hash checks indicating whether the original file or the format converted file has changed, and information indicating a status of the change.

6. A storage system according to claim 1, wherein checked hash values of original files and format converted files are used to create a status table of the original files and format converted files, indicating whether the files are changed or unchanged and whether an unchanged format converted file is able to be reconverted to an original file format.

7. A storage system according to claim 1, wherein a file is able to be stored at different locations on said storage media, on other storage media, or on other storage media of a remote storage system which is able to be accessed via a network based on a format of said file or a directory in which files are located.

8. A storage system according to claim 7, wherein storing of a file based on its format is conducted based on a file storing rule.

9. A storage system according to claim 1, wherein a list of formats in which a file is stored is able to be obtained.

10. A method of storing an original file and at least one format converted file of the original file in a storage system which includes a storage media, said method comprising the steps of:
    in response to a request to store an original file, converting the original file to at least one format converted file;
    storing the original file and the at least one format converted file on the storage media;
    managing a relationship between the original file and the format converted file to permit retrieval of either of the original file and the format converted file using an original inode that points to the original file, and by including in said original inode, for each said at least one format converted file, an inode number of a secondary inode corresponding to each said at least one format converted file;
    calculating a first hash value for the original file and storing said first hash value in said original inode;
    calculating a second hash value for each said at least one format converted file and storing each second hash value in the secondary inode corresponding to that format converted file; and
    using said first hash value to determine whether the original file has changed and/or using said second hash value to determine whether the corresponding format converted file has changed.

11. A method according to claim 10, wherein said storage system determines whether the original file has changed or whether the format converted file has changed by reading a file pointed to by said first inode or said second inode, respectively, calculating a new hash value for the read file, and comparing said new hash value with a respective one of said first hash value or said second hash value.

12. A method according to claim 10, wherein a file conversion unit performs the converting and said file conversion unit is external of said storage system.

13. A method according to claim 10, wherein a file conversion unit performs the converting and said file conversion unit calculates the first hash value of the original file and the second hash value of the format converted file, and
    wherein said first hash value is used to determine whether the original file has changed by
    reading the original file pointed to by a first inode that stores the first hash value,
    calculating a first new hash value from the original file as read, and
    comparing the first hash value stored in the first inode with the first new hash value to determine whether the original file has changed; and
    wherein said second hash value is used to determine whether the format converted file has changed by
    reading a second inode listed in said first inode for said format converted file,
    reading the format converted file pointed to by the second inode,
    calculating a second new hash value from the format converted file as read, and
    comparing the second hash value stored in the second inode with the second new hash value to determine whether the format converted file has changed.

14. A method according to claim 10, wherein a directory list is maintained indicating a corresponding relation between the original file, formats to which the original file has been converted, information based on hash checks indicating whether the original file or the format converted file has changed, and information indicating a status of the change.

15. A method according to claim 10, wherein checked hash values of original files and format converted files are used to create a status table of the original files and format converted files, indicating whether the files are changed or unchanged and whether an unchanged format converted file is able to be reconverted to an original file format.

16. A method according to claim 10, wherein a file is able to be stored at different locations on said storage media or on other storage media based on a format of said file.

17. A method according to claim 16, wherein storing of a file based on its format is conducted based on a file storing rule.

18. A method according to claim 10, wherein a list of formats in which a file is stored is able to be obtained.

19. A system comprising:
    a storage system which includes a storage media for storing files; and
    a file conversion unit, which is connected to said storage system and which in response to a request to store an original file, is configured to convert the original file to at least one format converted file,
    wherein said storage system stores the original file and the at least one format converted file on said storage media and manage a relationship between the original file and the format converted file to permit retrieval of either of the original file and the at least one format converted file by storing in a first inode a pointer to said original file and an inode number of a second inode, said second inode pointing to a corresponding format converted file,
    wherein said file conversion unit is configured to calculate a first hash value of the original file and, for each at least one format converted file, a second hash value corresponding to the format converted file, and
    wherein said first hash value is stored in said first inode, and is used to determine whether the original file has changed, and
    wherein each said second hash value is stored in the corresponding second inode, and is used to determine whether the corresponding format converted file has changed.

20. A system according to claim 19, wherein said storage system determines whether the original file has changed or whether the format converted file has changed by reading a file pointed to by said first inode or said second inode, respectively, calculating a new hash value for the read file, and comparing said new hash value with a respective one of said first hash value or said second hash value.

21. A system according to claim 19, wherein said file conversion unit is external of said storage system.

22. A system according to claim 19, wherein said file conversion unit calculates a first hash value of the original file which is stored with said first inode and a second hash value of the format converted file which is stored with said second inode, and wherein said first hash value is used to determine whether the original file has changed by reading the original file pointed to by the first inode that stores the first hash value, calculating a first new hash value from the original file as read, and comparing the first hash value stored with the first inode with the first new hash value to determine whether the original file has changed; and wherein said second hash value is used to determine whether the format converted file has changed by reading the second inode whose inode number was stored in said first inode for said format converted file, reading the format converted file pointed to by the second inode, calculating a second new hash value from the format converted file as read, and comparing the second hash value stored with the second inode with the second new hash value to determine whether the converted format file has changed.

23. A system according to claim 19, wherein a directory list is maintained indicating a corresponding relation between the original file, formats to which the original file has been converted, information based on hash checks indicating whether the original file or the format converted file has changed, and information indicating a status of the change.

24. A system according to claim 19, wherein checked hash values of original files and format converted files are used to create a status table of the original files and format converted files, indicating whether the files are changed or unchanged and whether an unchanged format converted file is able to be reconverted to an original file format.

25. A system according to claim 19, wherein a file is able to be stored at different locations on said storage media or on other storage media based on a format of said file.

26. A system according to claim 25, wherein storing of a file based on its format is conducted based on a file storing rule.

27. A storage system according to claim 19, wherein a list of formats in which a file is stored is able to be obtained.

* * * * *